Figure 1:
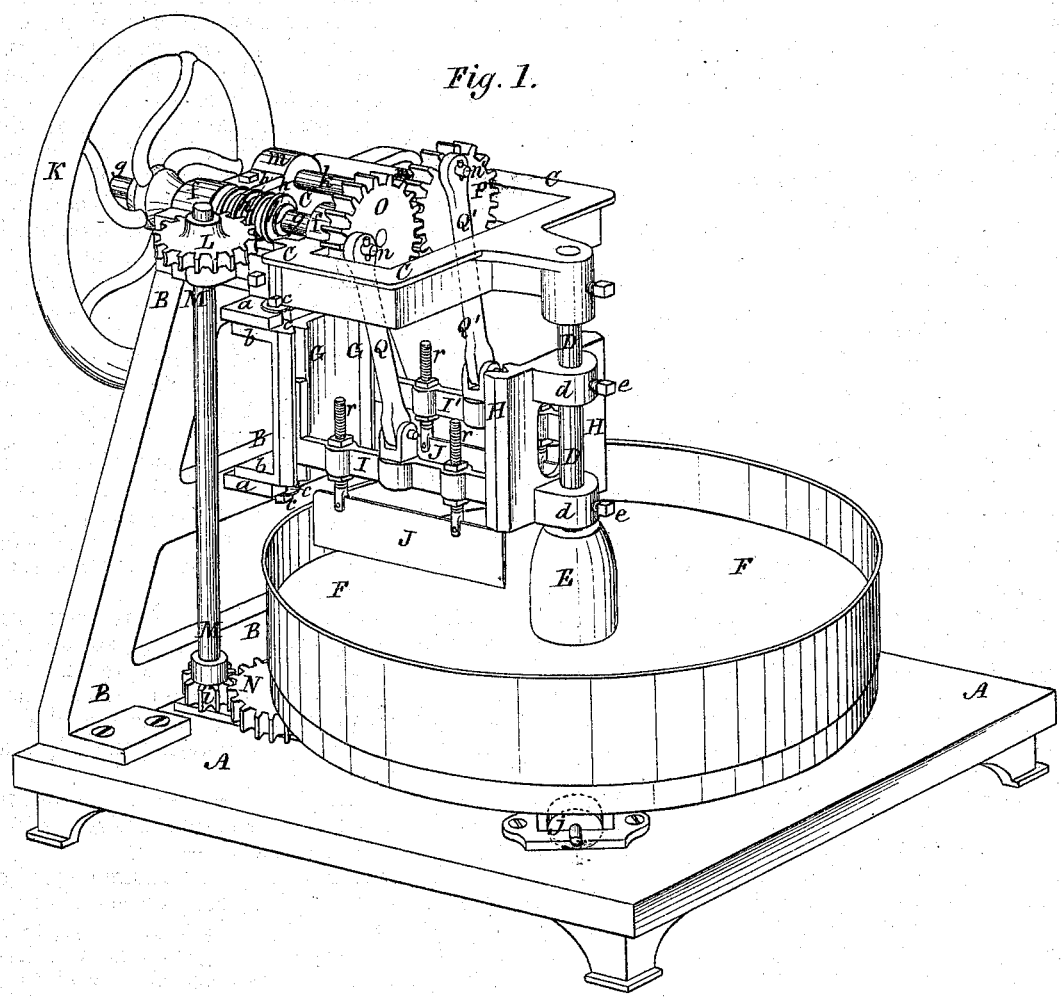

D. R. KENYON.

Improvement in Meat Cutters.

No. 124,748. Patented March 19, 1872.

Witnesses
D. P. Cowl
Edmund Masson

Inventor.
David R. Kenyon
By atty. A. B. Stoughton 124,748

UNITED STATES PATENT OFFICE.

DAVID R. KENYON, OF RARITAN, NEW JERSEY, ASSIGNOR TO HIMSELF AND JOB C. KENYON, OF SAME PLACE.

IMPROVEMENT IN MEAT-CUTTERS.

Specification forming part of Letters Patent No. 124,748, dated March 19, 1872.

*To all whom it may concern:*

Be it known that I, DAVID R. KENYON, of Raritan, in the county of Somerset and State of New Jersey, have invented certain new and useful Improvements in Machines for Cutting or Chopping Meat; and I do hereby declare the following to be a full, clear, and exact description of the same, reference being had to the accompanying drawing, marked Figure 1, which represents the machine in perspective.

My invention relates more especially to the construction of an overhanging frame for supporting the driving-gear, and for receiving, guiding, and controlling the pairs of cutters, as also to a vertical through shaft, for sustaining the front of the overhanging frame, and for forming a central support for the tub, which revolves around it.

On a base, bed, or support of any suitable kind, as at A, is secured a pillar-block or frame, B, of metal, on the top of which is fastened an overhanging or horizontal frame, C, the front of which overhanging frame is supported by a vertical shaft, D, which passes through the hub E of the tub or pan F, in which the meat or other article to be cut is placed, and through the bed, base, or table A, to which it is firmly attached at its lower end, so that said shaft not only supports the overhanging frame, but forms a central axis for the tub to turn upon. On the pillar-block or vertical frame B there are flanges *a a*, to which the guide-ways G are attached by their flanges *b b*, and on or to which they can be adjusted by the set-screws and slots, as at *c;* and upon the shaft D is secured, by the lugs *d* and set-screws *e*, another guide-way, H, with its ways or grooves facing those of the guide-way G, for forming a support and guidance for the reciprocating cross-heads I I', that carry the cutters or chopping-knives J J. In bearings or journal-boxes *f f*, on top of the frame C, is arranged a horizontal shaft, *g*, which may be furnished with a balance or fly wheel, K, and be turned in any well-known way to drive the machine. On this shaft *g* there is a worm, *h*, which works in a gear, L, attached to the upper end of a vertical shaft, M, and gives motion to said shaft. To the lower end of the shaft M there is affixed a pinion, *i*, which works in and turns a gear, N, and this gear N works into a large gear or cogged rim attached to and under the tub F, so as to give a slow rotary motion to said tub; and that the tub and its contents may be more easily revolved under the cutters, it is set upon friction-rolls, one of which is seen at *j*. To the outer end of the shaft *g* there is attached a gear-wheel, O, which meshes with and turns a similar gear, P, arranged upon a shaft, *k*, which is supported in bearings, *m*, on the frame C, said gears O and P being located in and operating through an opening in the horizontal frame. To crank-pins or wrists *n n'*, respectively, on or in the gears O P, are attached the upper ends of the connecting-rods or bars Q Q', the lower ends of which are, in the ordinary way, attached to the cross-heads I I', which carry the knives or cutters J J, and through this gearing said knives are rapidly moved up and down over the tub and its contents, which revolve slowly underneath them, and so chopping or finely cutting the meat or other article to be so reduced.

The cutters J J are attached to their cross-heads by screw-rods *r r*, having set and jam-nuts thereon, so that as the knives are worn away they may be adjusted so as just to touch, without chopping or scoring, the bottom of the tub, which is most generally made of wood.

Having thus fully described my invention, what I claim therein as new, and desire to secure by Letters Patent, is—

1. The construction and arrangement of the overhanging frame C, the double-driving or crank-gears O P, and the pair of cutters J J and their co-operative parts, substantially as and for the purpose described and represented.

2. I also claim the vertical shaft D, when so arranged as to form a support for the overhanging frame C, the guide-ways H, and for the tub F, substantially as described and represented.

DAVID R. KENYON.

Witnesses:
A. B. STOUGHTON,
EDMUND MASSON.